United States Patent [19]
King et al.

[11] Patent Number: 5,878,499
[45] Date of Patent: Mar. 9, 1999

[54] TRIMMER BAR FOR A CHAIN SAW

[76] Inventors: Pat King, 1800 N. Wildwood; Kenneth R. Collett, 11889 Fiddler Dr., both of Boise, Id. 83713

[21] Appl. No.: 853,493

[22] Filed: May 8, 1997

[51] Int. Cl.$^6$ .................................................. B27B 17/02
[52] U.S. Cl. ............................................. 30/371; 30/382
[58] Field of Search ............................... 30/371, 382, 383

[56] References Cited

U.S. PATENT DOCUMENTS

| | | | |
|---|---|---|---|
| 2,642,901 | 6/1953 | Hayden | 30/371 |
| 2,698,034 | 12/1954 | Jakku | 30/371 |
| 2,813,556 | 11/1957 | Woodworth | 30/371 |
| 2,925,105 | 2/1960 | Hayden | 30/371 |
| 3,808,684 | 5/1974 | Ludwig | 30/382 |
| 3,815,229 | 6/1974 | Granberg | 30/388 |
| 4,142,292 | 3/1979 | Ulrich | 30/371 |
| 4,270,272 | 6/1981 | Graham | 30/371 |
| 4,558,518 | 12/1985 | Morabit | 30/371 |
| 4,888,872 | 12/1989 | Eistrat | 30/371 |
| 5,123,168 | 6/1992 | Lyons | 30/382 |
| 5,560,111 | 10/1996 | Defredo | 30/371 |

FOREIGN PATENT DOCUMENTS 1574058  7/1969  France ...................................... 30/382

*Primary Examiner*—Hwei-Siu Payer
*Attorney, Agent, or Firm*—Ken J. Pedersen; Barbara S. Pedersen

[57] ABSTRACT

The invention is a cutter bar for a chain saw which permits quick and convenient trimming of hedges and shrubbery. The cutter bar is of conventional design, being relatively thin and elongated, and supporting a cutting chain which extends around its periphery. Additionally, the cutter bar of this invention has a plurality of spaced-apart tines which extend transversely out from the top and/or bottom of the cutter blade. The tines are fastened to or extend from a side or edge of the cutter blade, optionally by rivets passing through a shim or spacer—the tines are not connected to each other by a web or common casting other than the cutter blade. This way, the web or common casting does not add to the size, bulk, or weight of the cutter blade, allowing it to remain less burdensome and less interfering during cutting. In a preferred embodiment, the spacing on the cutter bar between tines varies so that branches or limbs of varying diameter may be accommodated by the cutter blade while cutting.

4 Claims, 4 Drawing Sheets

TRIMMER BAR FOR A CHAIN SAW

BACKGROUND OF THE INVENTION

1. Field of the Invention

This invention relates generally to chain saws and, more specifically, to cutter bars for chain saws which permit quick and convenient trimming of trees, brush, hedges and shrubbery.

2. Related Art

There have been several chain saw cutter bar designs for trimming hedges and shrubbery.

U.S. Pat. No. 3,808,684 (Ludwig) discloses a chain saw shield with V-shaped notches for trimming small branches.

U.S. Pat. No. 3,815,229 (Granberg) discloses a double-edged comb which can be removably secured to a chain saw cutter bar for hedge trimming. A device like this one by Granberg is marketed as Clip-N-Trim™ by Outdoor Power Equipment Company.

U.S. Pat. No. 4,142,292 (Ulrich) discloses a one-sided comb which can be removably secured to a chain saw cutter bar for hedge trimming.

U.S. Pat. No. 4,270,272 (Graham) discloses a single rigid bar attached near the front of the cutter bar, extending forwardly and downwardly beyond the lower edge of the blade, and backwardly and upwardly beyond the upper edge of the blade. The bar helps to stabilize smaller branches when cutting them.

U.S. Pat. No. 5,123,168 (Lyons) discloses a one-sided comb which can be removably attached to a cutter bar for hedge trimming. The front tine of this comb extends forwardly and downwardly past the lower edge of the blade.

U.S. Pat. No. 5,560,111 (Dofredo) discloses a double, double-sided comb which may be removably attached to a cutter bar for hedge trimming.

Still, these cutter bar designs are complex, costly or inefficient. Also, these designs do not permit the saw blade to easily pass through groups of small branches and limbs during cutting.

SUMMARY OF THE INVENTION

The invention is a cutter bar for a chain saw which permits quick and convenient trimming of hedges and shrubbery. The cutter bar is of conventional design, being relatively thin and elongated, and supporting a cutting chain which extends around its periphery. Additionally, the cutter bar of this invention has a plurality of spaced-apart tines which extend transversely out from the top and/or bottom of the cutter blade. The tines are fastened to or extend from a side or edge of the cutter blade, optionally via a shim or spacer—the tines are not connected to each other by a web or common casting other than the cutter blade. This way, the web or common casting does not add to the size, bulk, or weight of the cutter blade. Also, without the added bulk of the web or common casting, the saw blade and the spaced-apart tines of the trimmer bar of the invention may pass easily through the saw kerf in the branches or limbs being cut. In a preferred embodiment, the spacing on the cutter bar between tines varies so that branches or limbs of varying diameter may be accommodated by the cutter blade while cutting.

DESCRIPTION OF THE PREFERRED EMBODIMENTS

Figure 1:
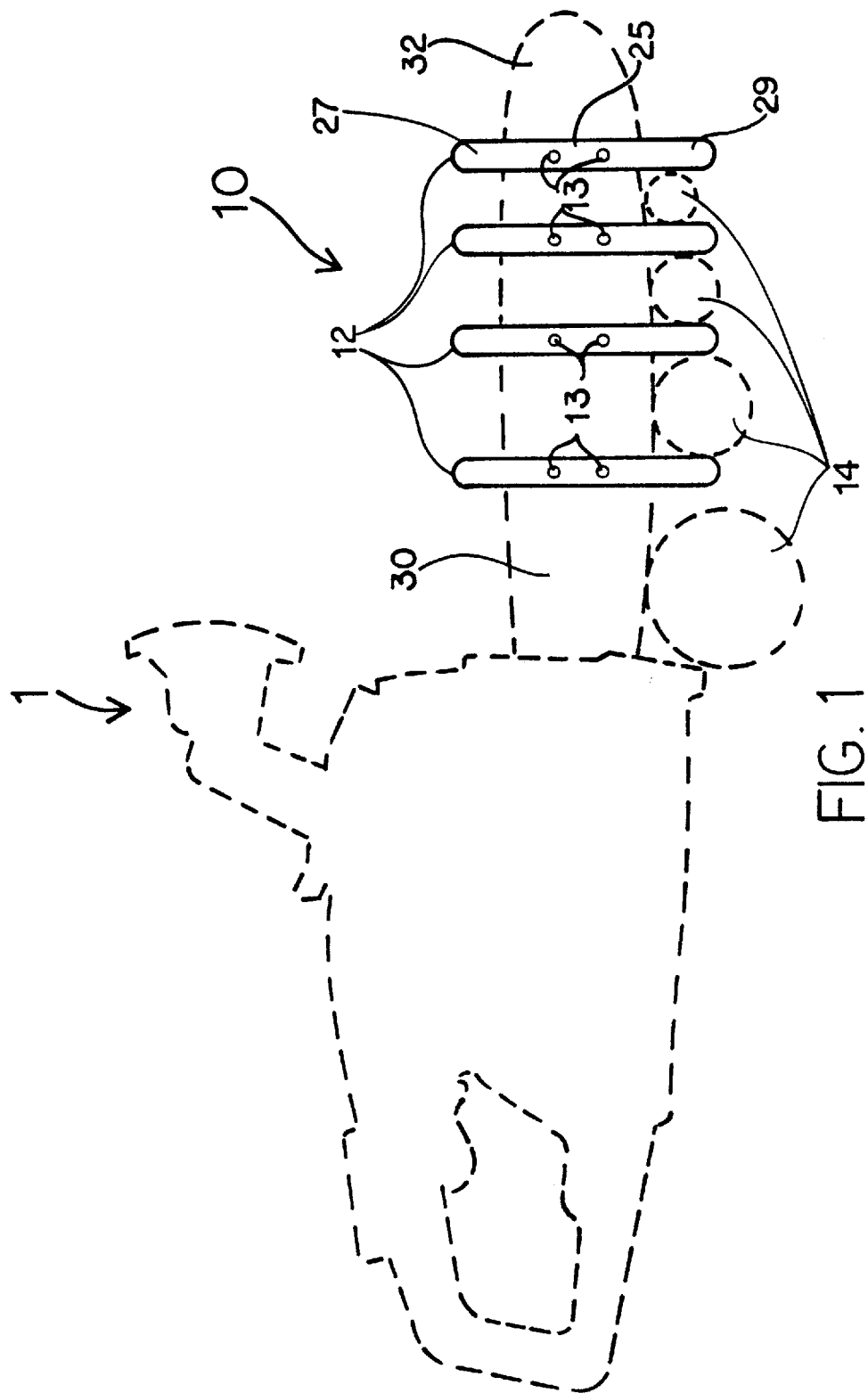
FIG. 1 is a side view of one embodiment of the cutter bar of the invention, showing the attached power saw motor housing and handle and several limbs being cut in dashed lines.

Referring to the Figures, there is depicted trimming power saw 1 and cutter bar 10 of the invention connected to saw 1. Cutter bar 10 has saw blade 11 and tines 12 connected to it. In this embodiment, tines 12 are connected to blade 11 by multiple rivets 13. Alternatively, tines 12 may be welded to, or integrally formed with, blade 11. As is apparent from FIG. 1, there is no web or common casting or any other structure other than blade 11 which connects tines 12 one to the other. Instead, tines 12 are separately connected to, and spaced-apart on, blade 11.

Tines 12 may be connected to either or both sides of blade 11, and by conventional means, such as riveting or welding. Or, tines 12 may be integrally formed with blade 11, as a result, for example, being cast or forged with blade 11. Tines 12 extend transversely out from the top and/or bottom of the blade 11, and originate on a side or on the edge of blade 11. Preferably, tines 12 are about ⅛-inch thick, about ⅝-inch wide and extend about 1 and ½–4 inches out from both the top and bottom of the blade.

Figure 2:
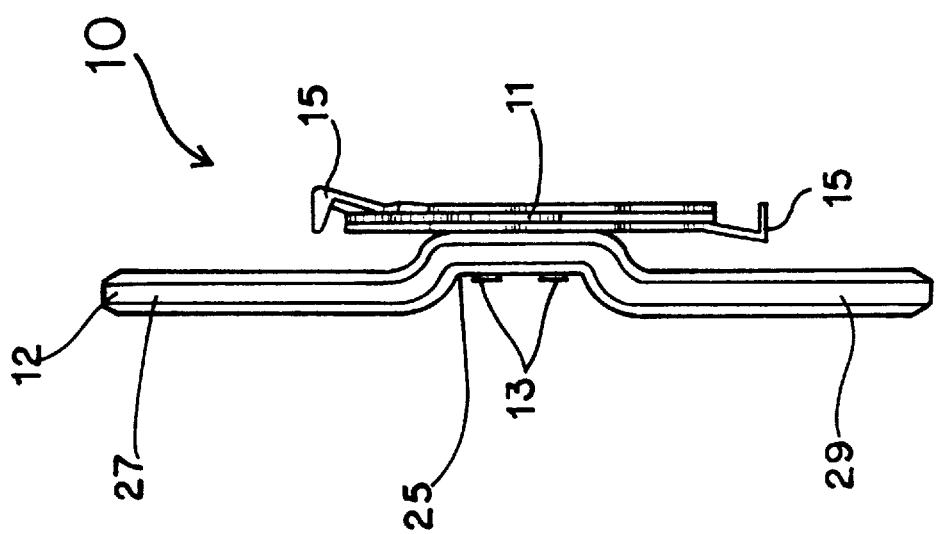
FIG. 2 is a front end view of one embodiment of the invention depicted in FIG. 1, showing the cutter blade and the front tine attached to it, the tine bending away from the saw blade beyond the points of its attachment to the blade.
Figure 3:
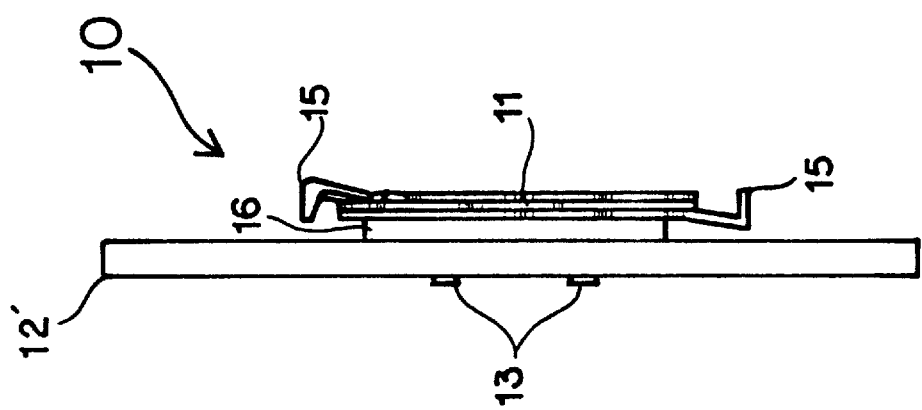
FIG. 3 is a front end view of an alternate embodiment of the invention depicted in FIG. 1, showing the cutter blade and the front tine, the tine being attached to the blade by rivets passing through a shim or spacer.
Figure 4:
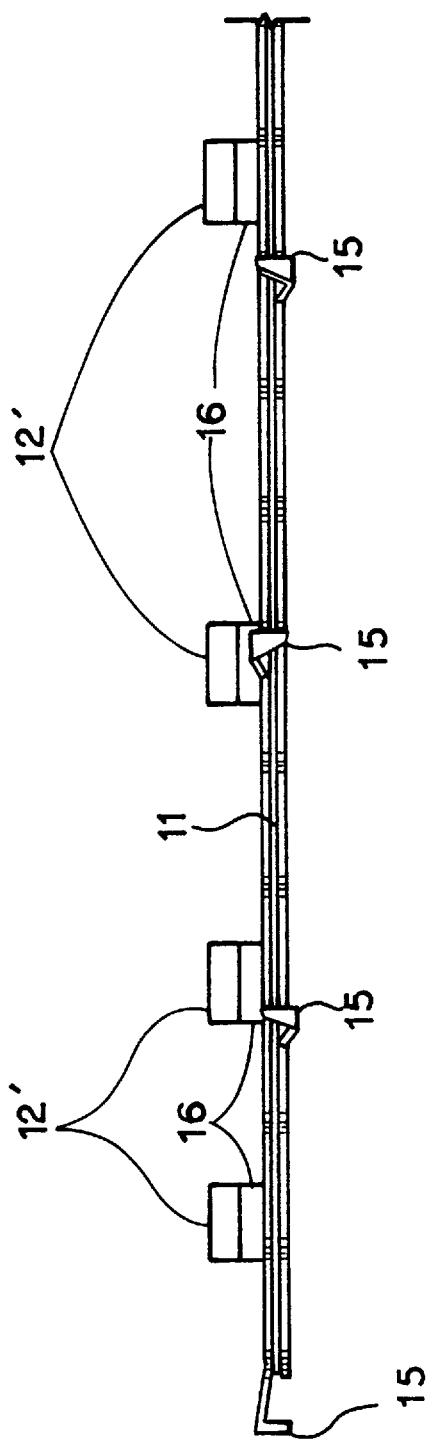
FIG. 4 is a top view of the embodiment of the invention depicted in FIG. 3.

Tines 12 may be fashioned so that they bend away from saw blade 11 beyond the point of their attachment to blade 11 as depicted in FIG. 2. As shown in the front end view of FIG. 2, the tines have a middle portion 25 connected to the saw blade, a top portion 27 and a bottom portion 29, wherein the top and bottom portions may bend away from the blade and may bend again to place the ends of the top and bottom portions distanced but parallel to the saw blade. Or, tines 12' may be fashioned flat, and connected to blade 11 by rivets passing through a shim or spacer 16, as depicted in FIG. 3. Shim or spacer 16 is fashioned to extend the height of the blade 11. This way, with either bent tines 12 or flat tines 12', clearance is provided between tines 12, 12' and saw teeth 15.

Tines 12, 12' are not connected to each other, except by blade 11. Tines 12, 12' are connected only to the side or edge of blade 11. There is no structure, other than the tine itself, on blade 11. Otherwise, the ease of cutting and the weight of the saw are negatively impacted. Also, without the added bulk of the web or common casting, the saw blade and the spaced-apart tines of the trimmer bar of the invention may pass easily through the saw kerf in the branches or limbs being cut.

Preferably tines 12, 12' are spaced-apart by varying distances. This way, they may accommodate branches and limbs 14 of varying diameter as depicted in FIG. 1, the tines acting as stops or braces for the branches 14 during cutting. Preferably, the distance between tines varies from 2 to 6 inches. As shown in FIG. 1, the tines near the first end 30 of the saw blade are farther apart than the tines near the second end 32 of the saw blade, so that the first end tines receive larger limbs and branches 14 than the second end tines.

Preferably, cutter bar 10 and saw blade 11 are made of steel or other very strong and durable material. Likewise, tines 12, 12' and shims 16 are preferably also made of steel.

In use, the power saw and cutter bar of this invention are operated much like an ordinary power saw. However, the user may swing the cutter bar and power saw more when using this invention, to cut groups of branches and limbs.

An added advantage from the use of the invention is that the tines offer more protection to the operator from cutting himself or herself with saw teeth 15.

Although this invention has been described above with reference to particular means, materials and embodiments, it is to be understood that the invention is not limited to these disclosed particulars, but extends instead to all equivalents within the scope of the following claims.

I claim:

1. A cutter bar for a chain saw, comprising:

a. an elongated saw blade; and b. a plurality of spaced-apart tines having a middle portion connected to the saw blade, a top portion extending out from the top of the saw blade, and a bottom portion extending out from the bottom of the saw blade, the tines not being connected to each other except by the saw blade, wherein the top portion and bottom portion bend away from the saw blade and also bend to place their outer ends distanced but parallel to the saw blade.

2. A cutter bar as in claim 1, wherein all of said tines are on one side of the saw blade.

3. A cutter bar as in claim 1, wherein the saw blade has a first end and a second end, and wherein said tines comprise a plurality of tines near the first end and a plurality of tines near the second end, wherein the tines near the first end are spaced apart differently than are the tines at the second end.

4. A cutter bar as in claim 3, wherein the tines near the first end are spaced apart by about 6 inches and the tines near the second end are spaced apart by about 2 inches.

* * * * *